Oct. 3, 1961  G. I. HACKENBERGER, JR  3,002,718
ROTOR BLADE DEICING SYSTEM
Filed July 8, 1960  3 Sheets-Sheet 1

INVENTOR.
GEORGE I. HACKENBEGER, JR.

BY *Teller + McCormick*

ATTORNEYS

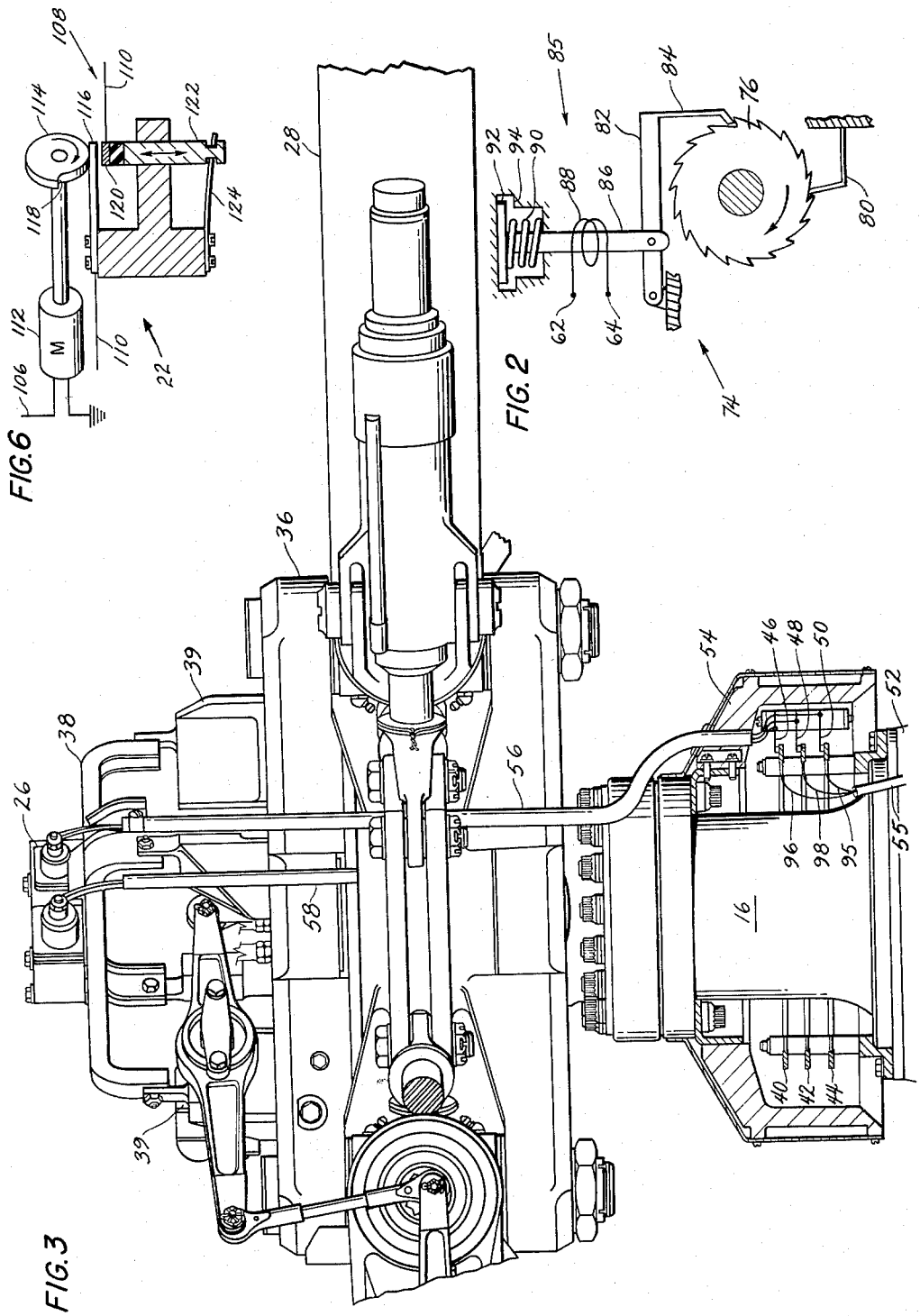

Oct. 3, 1961  G. I. HACKENBERGER, JR  3,002,718
ROTOR BLADE DEICING SYSTEM
Filed July 8, 1960  3 Sheets-Sheet 3

United States Patent Office 3,002,718
Patented Oct. 3, 1961

3,002,718
ROTOR BLADE DEICING SYSTEM
George I. Hackenberger, Jr., Suffield, Conn., assignor to The Kaman Aircraft Corporation, Bloomfield, Conn., a corporation of Connecticut
Filed July 8, 1960, Ser. No. 41,635
12 Claims. (Cl. 244—134)

This invention relates to helicopters and deals more particularly with a rotor blade deicing system for helicopters.

A general object of this invention is to provide a system for cyclically deicing the rotor blades of a helicopter by means of electrical heaters, the system being of a minimum size and weight and requiring a minimum amount of electrical power to fulfill its deicing function.

Another object of this invention is to provide an electrical deicing system for the rotor blades of a helicopter, the system including a plurality of heater elements in each blade and having an improved means for conducting electrical power from a source contained in the fuselage to the moving rotor hub and cyclically in sequence to the heater elements on each blade.

A further object of this invention is to provide a deicing system of the type mentioned in the last paragraph and wherein the number of slip rings, or other rotatable contact devices required for conducting electrical power from the fuselage to the moving blades is greatly reduced by the provision of a distributing device on the moving rotor which distributes the electrical energy in sequence to the heater elements on the blades after the energy passes through the slip rings.

Other objects and advantages will be apparent from the drawings and from the following description.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 2 is a schematic representation of the means employed for stepping the distributor employed in the system of FIG. 1.

FIG. 3 is an elevational view of a rotor hub of a helicopter provided with a deicing system in accordance with the present invention and showing the location of the distributor, the slip rings and other parts of the system, the slip rings and the housing therefor being shown in vertical section.

FIG. 6 is a schematic representation of a temperature responsive timer which may be employed in the system of FIG. 1.

Figure 1:
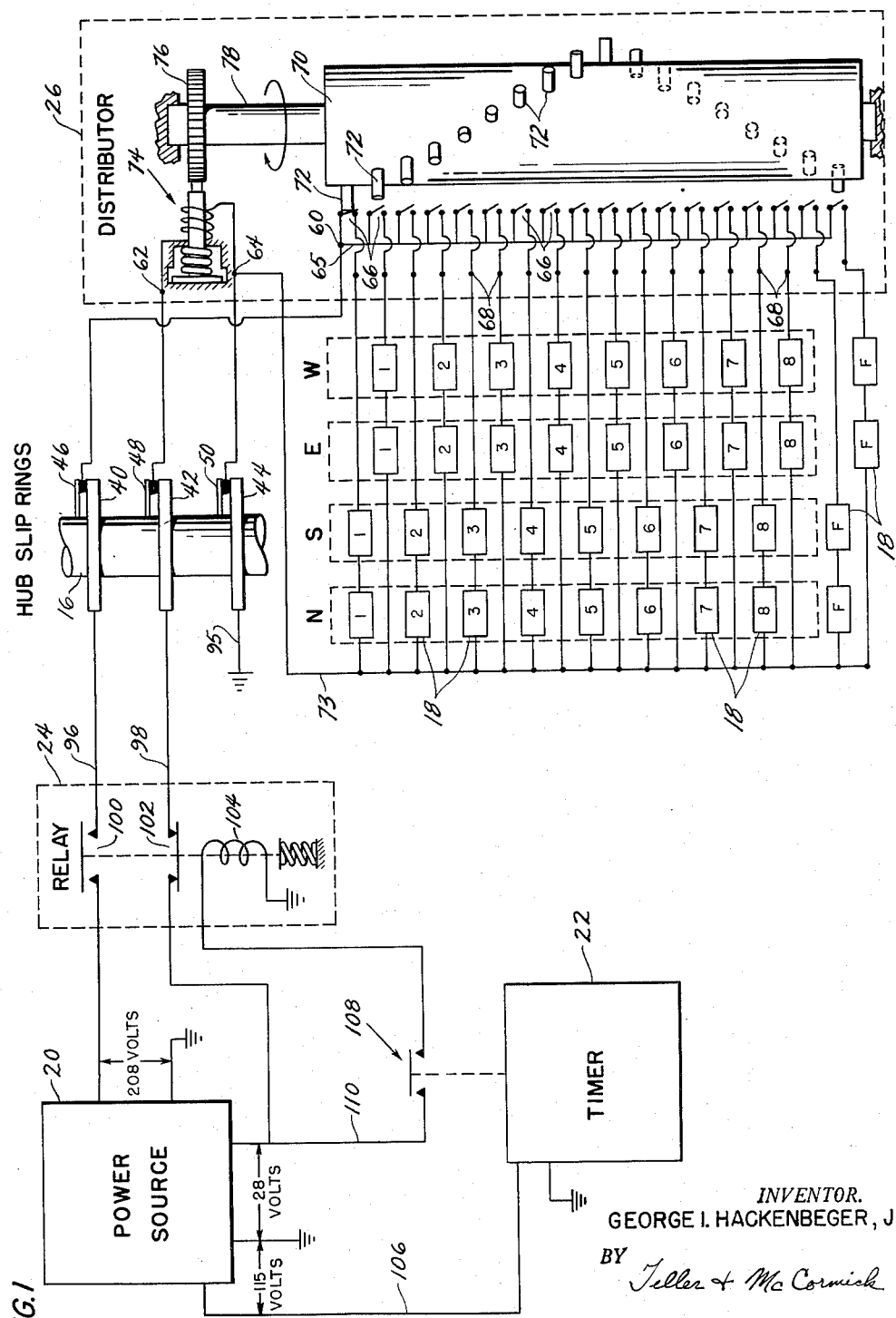
FIG. 1 is a schematic representation of a rotor blade deicing system embodying the present invention.

FIG. 1 shows schematcially the arrangement and cooperation of the various components comprising the rotor blade deicing system of the present invention. In this figure it is assumed that the system is installed in a helicopter having a four-bladed rotor supported from a fuselage by means of a rotatable main vertical shaft 16, but the number of blades is not important and may be varied. The four blades of FIG. 1 are represented by the four rows of broken line rectangles designated N, S, E and W, respectively, these letters representing the north, sourth, east and west directions in which directions the corresponding blades will point at a given instant of their travel. Each of the blades is provided with a plurality of heater elements 18, 18, each of which is effective when energized to heat an associated area of the blade surface. In FIG. 1 the individual heater elements on each blade are represented by the numbers 1 to 8 inclusive, there being eight heater elements on each blade. This number of elements may, however, be varied without departing from the invention and is chosen by way of example only. The particular helicopter with which the system of FIG. 1 is associated is also considered to be of the type in which the pitches of the blades are adjusted by means of auxiliary aerofoil flaps carried by the blades, and the system is shown to include provision for deicing these flaps by means of a heater element F associated with each blade and located adjacent the surface of the corresponding aerofoil pitch adjusting flap.

In addition to the heater elements 18, 18 on the blades of the helicopter the deicing system also includes a power source 20, a time 22, a relay 24 and a distributor 26. The power source 20 may take various forms and preferably consists of one or more auxiliary generators driven from the main engine, and may also include one or more voltage regulators, transformers or other conventional equipment. For the present purposes it is sufficient to note that the power source has an output of 208 volts at 400 cycles per second, another ouput of 115 volts at 400 cycles per second, and another output of 28 volts, D.C. These particular voltages and frequencies are, however, chosen by way of example only and may be varied.

Figure 4:
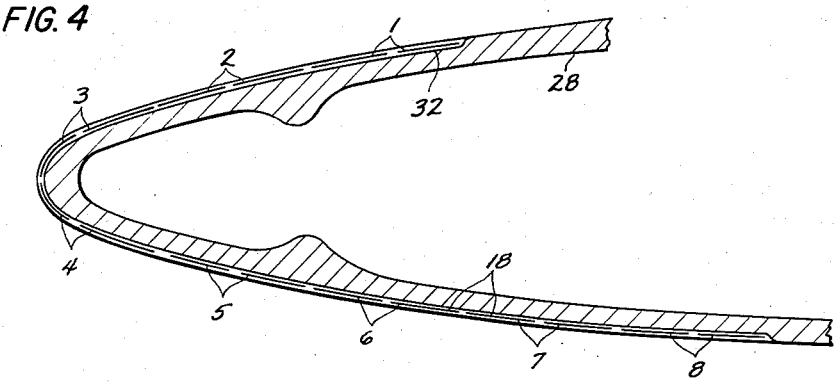
FIG. 4 is a fragmentary sectional view of the leading edge of a helicopter rotor blade equipped with heating elements in accordance with the present invention, the view being taken on a transverse plane through the blade.
Figure 5:
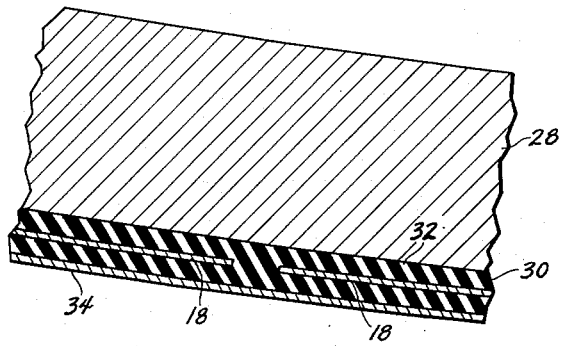
FIG. 5 is an enlarged fragmentary view of a section of the blade shown in FIG. 4 and illustrating the arrangement of the heater elements adjacent the outer surface of the blade.

Before considering in more detail the arrangement and operation of the components of the system shown in FIG. 1, reference is made to FIGS. 4 and 5 which show the arrangement of the heater elements 18, 18 on a blade to be protected against ice accumulation. FIG. 4 shows the leading edge portion of such a blade, which leading portion is provided by a metallic spar indicated by the reference character 28. From various studies it has been found that water droplets in the air tend to impinge only in a certain area of the moving blade and that therefore only this surface need be provided with deicing heaters. This area comprises the leading portion of the blade surface along the full span of the blade and from the leading edge rearwardly to a distance of from ten to twenty-five percent of the chord on both the top and bottom of the blade. For the purposes of this invention the surface to be deiced is divided into different areas or zones by the heater elements and the latter are cyclically energized in sequence so that the various areas are heated cyclically at different times and are unheated during the major portion of the deicing cycle. During the time that an area is unheated ice will accumulate thereon, and when the area is later heated the accumulated ice is melted adjacent the surface of the protected blade area only to an extent sufficient to overcome the adhesion of the ice to the surface, thereby freeing the ice from the area and permitting it to shed from the blade. It is contemplated that the blade may be divided into areas either chordwise or spanwise. However, the division into chordwise areas is preferred and shown in FIGS. 4 and 5. In chordwise division the heater elements run the full span of the blade, and in the blade of FIG. 4 eight heater elements are shown which divide the protected surface into eight chordwise areas. The eight heater elements are numbered 1 to 8, inclusive, and correspond to the elements numbered 1 to 8, inclusive, on any one of the blades of FIG. 1.

In the drawings each of the heater elements 18, 18 is shown to consist of two thin strips of electrical resistance extending side by side from the root to the tip of the blade. At the blade tip the two strips are electrically connected in series, while at the root of the blade the ends of the strips are equipped with terminals for supplying electrical energy to the element. As shown best in FIG. 5, the strips comprising the heater elements 18, 18 are embedded in a layer or boot 30 of neoprene or similar electrical insulation material which is positioned in a recess 32 formed in the leading surface of the metallic spar 28 at the leading portion of the blade. Surrounding the neoprene boot is a protective layer or jacket 34 of stainless steel or similar material. The construction of the heater elements, however, by itself forms no part of this invention and various other types of heater elements may be employed therewith. For example, instead of strips of resistance material, each heater element may consist of one or more lengths of resistance wire embedded in suitable insulating material. In the operation of the system the heater elements 18, 18 are energized in the order shown; that is, at the beginning of the cycle the element 1 is first energized, the element 2 is next energized and so on until the element 8 is energized. After the element 8 is energized, the element F on the associated pitch changing flap is energized, and then the sequence of energization is repeated by again starting with the element 1.

The sequential energization of the heater elements 18, 18 is in the present invention controlled by the distributor 26 which is mounted on the main body of the rotor hub 36 which is fixedly connected with the main shaft 16. When there are four blades, the hub 36 has four radial arms with which the blades are respectively connected. The distributor 26 is positioned above the hub 36 and it is carried by a bracket 38 which is fixedly connected with the hub 36 by means of support elements 39, 39. Power for energizing the heater elements 18, 18 on the blades and for operating the distributor 26 is supplied to the latter through rotatable contacts in the form of three slip rings 40, 42 and 44 and three associated brushes 46, 48 and 50. As shown, the slip rings 40, 42 and 44 are stationary and are carried by a pylon 52 forming a part of the fuselage. The brushes 46, 48 and 50 are rotatable with the main shaft 16 and the hub 36 and they are carried by and located within a rotatable housing 54 secured to the shaft.

A stationary conduit 55 carried by the pylon 52 receives conductors which are connected with the nonrotatable slip rings 40, 42 and 44. A conduit 56 carried by the rotatable hub receives conductors which conduct electrical energy from the brushes 46, 48 and 50 to the distributor 26, and another conduit 58 also carried by the rotatable hub receives conductors which conduct electrical energy from the distributor to the heater elements on the blades.

Referring again to FIG. 1, the structure of the distributor 26 is shown in a somewhat simplified and schematic form in order to more clearly illustrate its function, and it will be understood that various other structures may be employed so long as they fulfill a distributing function similar to the one shown. The illustrated distributor 26 includes a high voltage input terminal 60, a low voltage input terminal 62, and a ground terminal 64. Connected in parallel to the high voltage input terminal 60, by means of a common line 65, are the corresponding sides of a plurality of normally open switches 66, 66, each of which has its other side connected to a corresponding one of a plurality of output terminals 68, 68. That is, the terminals indicated at 68, 68 represent corresponding sides of the switches 66, 66, which switches have their other sides connected together by the common line 65. The contacts or actuating members of the switches 66, 66 are arranged in a straight line within the distributor 26, and parallel to this line of contacts is a cylinder 70 having a plurality of radial pins 72, 72 arranged in helical fashion on its periphery. The cylinder 70 is mounted for rotation within the distributor body and at one end is provided with a stepping mechanism 74 which serves to rotate the cylinder in fixed angular increments. For each of the switches 66, 66 there corresponds a pin 72, and the stepping mechanism is such that the number of incremental movements required to complete one revolution of the cylinder 70 is equal to the number of pins and switches. In the present instance, the distributor includes eighteen pins and switches and the stepping mechanism is effective to rotate the cylinder one full revolution in eighteen steps or increments. At each step position of the cylinder 70 provided by the operation of the mechanism 74 a different one of the pins 72, 72 will be in engagement with its associated switch 66 and will serve to close the switch to complete a circuit between the input terminal 60 of the distributor and the output terminal 68 corresponding to the switch which is closed. From FIG. 1, it will be obvious that due to the helical arrangement of the pins 72, 72, the switches 66, 66 will be progressively operated. That is, assuming that the step mechanism 74 serves to rotate the cylinder in the direction indicated by the arrow, the pins 72, 72 will act to first close the top switch 66, then the second switch from the top, and then so on until the bottom switch 66 is operated. Furthermore, as each switch is closed the previously closed switch is opened so that only one switch is closed at a time. For example, as the cylinder 70 in FIG. 1 is rotated to close the second switch from the top the first switch will be opened. In other words, the distributor 26 has eighteen step positions at each of which positions a different one of the pins 72, 72 will engage and operate a respective one of the switches 66, 66 to electrically connect one of the output terminals, 68, 68 to the input terminal 60.

From FIG. 1, it will also be seen that the electrical heater elements 18, 18 are so connected with the output terminals 68, 68 of the distributor that as the distributor is stepped through its eighteen step positions the heater elements of each blade are sequentially placed in circuit between the input terminal 60 and the ground terminal 64, the heater elements being connected to the ground terminal 64 by connection to a common ground line 73. Also, it will be seen that the equivalent elements on the N and S blades are connected in series so that these elements are simultaneously energized, and likewise the elements on the E and W blades are connected in series and simultaneously energized. For example, it will be noted that the two number 1 elements on the N and S blades are connected in series and will be placed in circuit when the first or upper switch 66, as viewed in FIG. 1, is closed. Similarly, the two number 1 heater elements on the E and W blades are connected in series and will be placed in circuit when the second switch 66 is closed. When the third switch 66 is closed the number 2 heater elements of the N and S blades are placed in circuit, and upon further progressive closing of the switches 66, 66 the blades will be alternately energized in pairs, and sequentially with respect to the heater elements, until each heater element, including the elements F on the flaps has been energized. The same cycle is then repeated. Of course, other schemes for interconnecting and intermittently energizing the heater elements could be employed without departing from the invention. For example, in a four-bladed rotor it may be desirable to energize all four blades simultaneously rather than alternately in opposing pairs, or it may be desirable to energize only one blade at a time. In the case of rotors having more or less than four blades, still other schemes may be employed.

As described in more detail below, the high voltage electrical energy utilized by the heater elements 18, 18 is supplied to the distributor 26 in timed pulses, and the distributor is stepped between its various step positions during the intervals between the pulses so that the opening and closing of the switches 66, 66 takes place at times when no current is flowing through closed switch contacts and no voltage difference is appearing across open switch contacts. This stepping of the distributor is provided for by supplying low voltage pulses of electrical energy to the distributor during the intervals between the high voltage pulses, with the low voltage pulses being employed to operate a stepping means 74. A simplified construction of a suitable stepping means 74 is shown somewhat schematically in FIGS. 1 and 2, but this structure is shown by way of example only and other stepping means could be employed. The means shown at 74 includes a ratchet wheel 76 having eighteen teeth and fixed to a shaft 78, which extends axially from one end of the cylinder 70, so that rotation of the ratchet wheel will cause concurrent rotation of the cylinder 70. Attached to the body of the distributor is a spring pawl 80 which is biased toward the periphery of the ratchet wheel and normally engages the same, as shown in FIG. 2, and cooperates with the teeth to releasably hold the wheel in a generally fixed angular position. Also attached to the body of the distributor is a pivoted arm 82 having a spring finger 84, which finger is also biased toward the periphery of the wheel and, in cooperation with the teeth thereof, is operable to incrementally rotate the wheel in the clockwise sense, as viewed in FIG. 2, upon oscillation of the pivoted arm. Movement of the pivoted arm is effected and controlled by a spring biased solenoid motor 85 including a plunger 86 and a coil 88 energized by the low voltage pulses. In FIG. 2 the solenoid motor 85 is shown in its unenergized position wherein the plunger 86 is held in a raised position by a spring 90. When the coil 88 is energized, however, the plunger will be moved downwardly against the force of the spring 90 to the limit permitted by the engagement of the flange 92 with a suitable abutment 94, the limit of the plunger movement being sufficient to cause the pivoted arm 82 and the finger 84 to move the ratchet wheel a distance of one tooth, or one increment. In this case, since there are eighteen ratchet teeth, one increment of movement is equal to 20° of angular movement of the ratchet wheel and the cylinder. Subsequent de-energization of the solenoid coil 83 permits the spring 90 to again return the plunger 86 to its raised position so that upon further energization of the coil the ratchet wheel will again be moved another increment of angular distance. Thus, each time the coil is energized after an immediately preceding period of de-energization the ratchet wheel is moved one increment to cause stepping of the distributor from one of its step positions to the next step position.

The power source 20 is located in or on the fuselage of the helicopter and preferably one side of each of the three different outputs is grounded to the fuselage, as indicated in FIG. 1. Likewise, the ground terminal 64 of the distributor is grounded to the fuselage through the brush 50 and the slip ring 44 and a line 95 so that the fuselage constitutes a part of the electrical circuit between the power source and the heaters 18, 18 and between the power source and the solenoid coil 88 of the stepping means 74. The ungrounded terminal of the high voltage (208 volt) output is connected to the input terminal 60 of the distributor by the line 96 and through rotatable contacts provided by the slip ring 40 and the brush 46. The ungrounded terminal of the low voltage (28 volt) output is connected to the input terminal 62 of the distributor by the line 98 and through the slip ring 42 and the brush 48. Conductors constituting parts of the lines 94, 96 and 98 are located within the before-mentioned conduit 55.

The power source 20 is preferably designed to provide continuous output voltages and the generation of alternating pulses of high and low voltage electrical energy effected by the relay 24 which operates to alternately make and break the high and low voltage circuits to the distributor 26. The relay 24 contains two switches 100 and 102 which are located in the lines 96 and 98, respectively, and are simultaneously operable by a solenoid coil 104. When the relay solenoid coil 104 is de-energized the switches assume the positions shown in FIG. 1 wherein the switch 100 is open and the switch 102 is closed. Energization of the relay coil, on the other hand, operates the switches to close the switch 100 and to open the switch 102. Repeated energization and de-energization of the relay coil 104 will therefore cause repeated opening and closing of switch 100, and in this manner interrupt the flow of current through the line 96 to produce pulses of high voltage electrical energy delivered to the distributor, and will simultaneously cause repeated closing and opening of the switch 102 in opposition to the switch 100 to interrupt the flow of low voltage current through the line 98 and produce pulses of low voltage electrical energy which are delivered to the distributor in the intervals between the high voltage pulses.

Repeated operation of the relay coil 104 is effected and controlled by the timer 22 which is operated by the 115 volt output of the power source 20 and is connected to the ungrounded terminal thereof by the line 106. The timer 22 operates a switch 108 in the line 110 to the relay coil 104 so that when the switch 108 is open the relay coil is de-energized and when closed the coil is energized. The amount of time the switch 108 is held open and closed by the timer will, of course, determine the length of time each heater element is energized, and the amount of time elapsing between successive heater element energizations. The length of time each heater element is energized is generally referred to as the "on" time, and the length of time between the end of the energization of one heater element and the start of the energization of the next heater element is generally referred to as the "off" time. Preferably, the timer is responsive to changes in the outside air temperature to vary the length of the "on" and/or "off" time to increase the average amount of electrical energy flowing to the heater elements as the outside air temperature decreases and to decrease the average amount of electrical energy flowing to the heater elements as the temperature increases. For example, in one installation where the power density of the heater elements was approximately 20 watts per square inch it was found that for an "off" time of approximately 120 seconds the "on" time should be about 5 seconds at an outside air temperature of 0° F. and about 1 second at 30° F. Too little "on" time will prevent clean shedding of the ice from the blade and too much "on" time will melt the ice and cause excess water which may run back toward the trailing edge of the blade surface and there refreeze at an unprotected area.

The timer 22 by itself forms no part of this invention and it is contemplated that any one of various suitable commercially available timing devices may be employed in the deicing system of FIG. 1. A schematic representation of a suitable timer, however, is shown in FIG. 6. The timer shown includes a motor 112 having a cam 114 attached to its output shaft. The periphery of the cam 114 bears against the surface of a leaf spring contact 116 and is shaped to gradually move the contact downwardly as the cam is rotated by the motor shaft in the direction of the arrow, until the spring rides over the ledge 118 on the cam periphery, at which point the same cycle of downward movement is begun again. As the spring contact is moved downwardly it will at some point in the movement of the cam engage another contact 120 carried by a member 122 which is slidably mounted for movement toward and away from the spring contact 116. Movement of the sliding member 122 is effected by a bimetallic temperature responsive leaf element 124 which is exposed to the outside air temperature and arranged so that for a decrease in temperature the contact 120 will be moved toward the contact 116 and for an increase in temperature the contact 120 will be moved away from the contact 116. The contacts 116 and 120 may constitute the switch 108 of FIG. 1, as indicated in FIG. 6, or may serve to contact another relay for actuating the switch. From FIGS. 1 and 6, it will be obvious that a movement of the contact 120 toward the spring contact 116 due to a decrease in temperature will result in an increase in the "on" time and a decrease in the "off" time so that the average amount of electrical energy supplied to the heater elements 18, 18 is increased to increase the heating effect of the system. Similarly, a movement of the contact 120 away from the spring contact 116 due to an increase in temperature will cause the "on" time to be decreased and the "off" time to be increased, with a resulting decrease in the average amount of electrical energy supplied to the heater elements. Of course, it is to be understood that it is not necessary to vary both the "off" and the "on" time to change the heating effect of the system and that a suitable timer may be operable to vary either of these two quantities while maintaining the other constant.

The operation of the deicing system may now be briefly summarized with reference to FIG. 1. Electrical energy for operating the heater elements 18, 18 is supplied from the high voltage output of the power source 20 located in or on the helicopter fuselage. This energy is conducted to the distributor 26 through the line 96 and through the slip ring 40 and brush 48, with one side of the high voltage output and the distributor terminal 64 being grounded to the fuselage to complete the electrical circuit between the power source and the distributor. The terminal 64 is grounded to the fuselage through the slip ring 44 and the brush 52. The power source 20 is effective to deliver a continuous supply of electrical energy at the high voltage output; however, the flow of energy through the line 96 is interrupted by the switch 100 of the relay 24 to produce intermittent pulses of electrical energy delivered to the distributor 26. Operation of the relay 24 is in turn controlled by the timer 22 which cycles the switch 108 between open and closed positions and holds the same in such positions for given intervals of time. Closing of the timer switch 108 operates the relay coil 104 to close the switch 100 to permit the flow of electrical energy to the distributor, and opening the switch 108 de-energizes the coil 104 to open the switch 100 and terminate the flow to the distributor.

After a pulse of electrical energy reaches the distributor input terminal 60, it flows through the common line 65 and then through the one switch 66 which is closed by one of the pins 72, 72 on the distributor cylinder 70. The closed switch 66 places two of the heater elements 18, 18 in circuit with the flow of electrical energy so that the two heater elements will be energized to heat a portion of the surface of the rotor blade on which they are located.

During the intervals between the high voltage pulses of electrical energy supplied to the distributor 26, low voltage pulses of electrical energy are supplied to the stepping mechanism 74 to step the cylinder 70 progressively through its various positions. These low voltage pulses are produced by the relay switch 102 which is located in the low voltage line 98 and operated in opposition to the switch 100 to interrupt the flow of electrical energy through the line 98. The low voltage pulses are transmitted to the distributor input terminal 62 through the slip ring 42 and the brush 50 on the rotor hub. The operation of the stepping mechanism 74 is such that after each pulse of high voltage electrical energy the cylinder 70 is rotated to close a different switch 66 so that the following high voltage pulse will energize heater elements different from those energized by the preceding pulse. The arrangement of the switches 66, 66, the pins 72, 72, and the heater elements 18, 18 is such that as the cylinder 70 is progressively stepped through its various positions the heater elements on a particular blade will be operated in sequence. Referring to FIG. 4, this means that at a beginning of a cycle the heater element Number 1 will be first energized, the heater element Number 2 next energized and so on until the heater element Number 8 is energized; then the heater element F is energized after which the cycle is repeated with the energization of the heater element Number 1.

Figure 7:
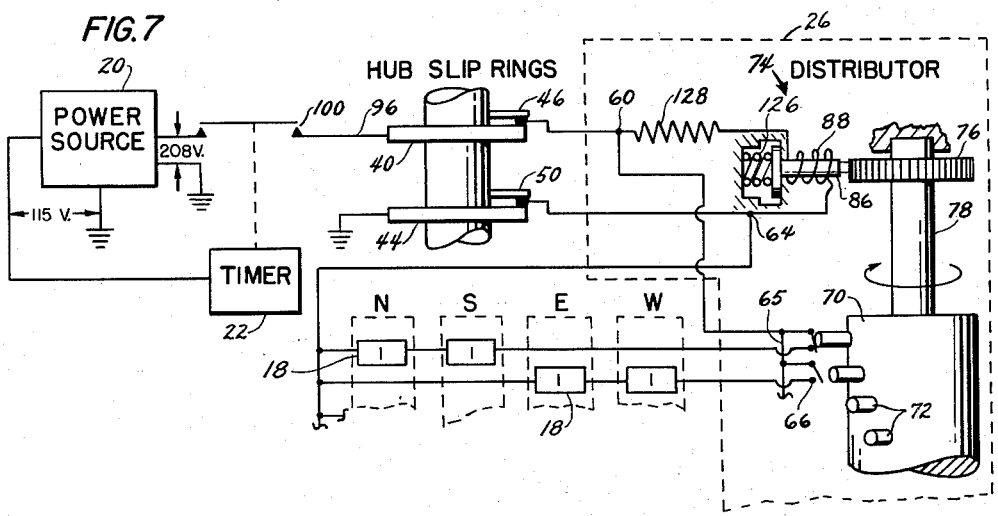
FIG. 7 is a partial schematic representation of a rotor blade deicing system comprising another embodiment of this invention.

An alternative and somewhat simplified deicing system embodying this invention is shown schematically in FIG. 7. In this figure the construction of the distributor cylinder 70 and the arrangement and the interconnection of the heater elements 18, 18 is assumed to be the same as that shown in FIG. 1, and therefore these features are only partly shown in FIG. 7. The system disclosed by FIG. 7 produces substantially the same results as that of FIG. 1, but differs therefrom in requiring only two slip ring assemblies on the rotor hub and in eliminating the need for a low voltage output from the power source. These ends are achieved in the system of FIG. 7 by effecting the operation of the stepping mechanism 74 with the high voltage pulses of electrical energy supplied to the distributor 26. The solenoid motor of the stepping mechanism 74 is modified from that of FIGS. 1 and 2 so that the coil 88 thereof when energized will move the plunger 86 to compress a spring 126 and raise rather than lower the pivoted arm 82 and spring finger 84. When the coil 88 is de-energized, the spring 126 serves to return the plunger 86 to its lowered position and operates the arm 82 and spring finger 84 to move the ratchet wheel 76. Thus the mode of operation of the stepping mechanism 74 is in effect reversed from that of FIGS. 1 and 2 with the result that the mechanism is cocked or conditioned by the energization of its coil and is effective to shift the cylinder 70 from one step position to the next when the coil is de-energized.

High voltage energy is supplied to the distributor 26 of the FIG. 7 system in substantially the same manner as in the FIG. 1 system. That is, electrical energy from the high voltage (208 volt) output of the power source 20 is delivered to the input terminal 60 by means of the line 96 and through the slip ring 40 and brush 48. The ground terminal 64 is likewise grounded to the fuselage of the helicopter through the slip ring 44 and brush 52. The coil 88 of the stepping mechanism 74 is connected in parallel with the heater elements 18, 18 between the input terminal 60 and the ground terminal 64, and preferably a resistor 128 is included in series with the coil to lower the voltage and current applied to the coil. Since this system eliminates the need for low voltage pulses alternating with high voltage pulses, the timer 22 may, as shown in FIG. 7, be adapted to control directly the switch 100 in the line 96.

It is believed that the operation of the FIG. 7 system should be obvious from the above description. High voltage electrical energy from the power source 20 is broken into timed pulses by the operation of the timer 22 which opens and closes the switch 100. As a pulse of electrical energy reaches the distributor 26 most of the energy will flow through the one closed switch 66 and the two associated heater elements 18, 18. At the same time, a small portion of the electrical energy will flow through the solenoid motor coil 88 of the stepping mechanism 74 and cause the same to be cocked or conditioned to effect movement of the cylinder 70 when the flow of electrical energy through the coil is terminated. Therefore, when the pulse is terminated the cylinder 70 will be moved to its next step position so that the following pulse will energize a different set of heater elements 18, 18. The arrangements of the parts, of course, is such that the heater elements on a particular blade will be energized in sequence. It will be noted that, similar to the system of FIG. 1, the switches 66, 66 in this system are closed and opened during the intervals between the high voltage pulses so that sparking and erosion of the switch contacts are minimized.

The invention claimed is:

1. In a rotor blade deicing system for a helicopter including a fuselage and including a rotor blade connected to a hub supported for rotation relative to the fuselage, the combination of a plurality of electrical heater elements located adjacent the surface of said blade and arranged so that each element is respectively associated with a different area of said blade surface, a source of electrical energy carried by said fuselage, a distributor mounted on said hub for rotation therewith and operable to distribute electrical energy in sequence to said heater elements, and means including contacts rotatable with said hub for conducting electrical energy from said source to said distributor for distribution to said heater elements.

2. In a rotor blade deicing system for a helicopter including a fuselage and including a rotor blade connected to a hub supported for rotation relative to the fuselage, the combination of a plurality of heater elements disposed adjacent the surface of said blade and arranged so that each element is respectively associated with a different area of said blade surface, means carried by said fuselage for generating pulses of electrical energy, a distributor mounted on said hub for rotation therewith and which distributor is electrically connected with said heater elements and includes contact means operable to sequentially place said heater elements in circuit with said pulses of electrical energy, means including contacts rotatable with said hub for conducting said pulses of electrical energy to said distributor, and means included in said distributor and operable during each interval between successive pulses of electrical energy to operate said contact means to break the circuit to one of said heater elements and to place the next heater element of the sequence in circuit with the next pulse of electrical energy.

3. In a rotor blade deicing system for a helicopter including a fuselage and including a rotor blade connected to a hub supported for rotation relative to the fuselage, the combination of a plurality of electrical heater elements located adjacent the surface of said blade and arranged so that each is respectively associated with a different area of said blade surface, means carried by said fuselage for generating pulses of electrical energy, a distributor mounted on said hub for rotation therewith which distributor is electrically connected with said heater elements and has a plurality of step positions at each of which positions an electrical circuit is completed to a different one of said heater elements, means including contacts rotatable with said hub for conducting said pulses of electrical energy to said distributor for distribution to said heater elements, and means included in said distributor for stepping said distributor from one of said step positions to another during the intervals between said pulses of electrical energy and in such a manner that said heater elements are sequentially placed in circuit with said pulses of electrical energy.

4. In a rotor blade deicing system for a helicopter including a fuselage and including a rotor blade connected to a hub supported for rotation relative to the fuselage, the combination of a plurality of heater elements disposed adjacent the surface of said blade and arranged so that each element is respectively associated with a different area of said blade surface, means carried by said fuselage for generating pulses of electrical energy, a distributor mounted on said hub for rotation therewith and which distributor is electrically connected with said heater elements and has a plurality of step positions at each of which step positions an electrical circuit is completed to a different one of said heater elements, means including contacts rotatable with said hub for conducting said pulses of electrical energy to said distributor, and stepping means included in said distributor for stepping the same sequentially through said plurality of step positions, said stepping means being energizable by said pulses of electrical energy and upon de-energization at the termination of each pulse being operable to step said distributor from one step position to the next step position in the sequence with the result that the stepping of said distributor is effected by said pulses of electrical energy and controlled in accordance therewith so that successive pulses are conducted to successive heater elements in a sequential order.

5. In a rotor blade deicing system for a helicopter including a fuselage and including a rotor blade connected to a hub supported for rotation relative to the fuselage, the combination of a plurality of heater elements disposed adjacent the surface of said blade and arranged so that each element is respectively associated with a different area of said blade surface, means carried by said fuselage for generating pulses of high voltage electrical energy alternating with pulses of low voltage electrical energy, a distributor mounted on said hub for rotation therewith and which distributor is electrically connected with said heater elements and has a plurality of step positions at each of which step positions an electrical circuit is completed to a different one of said heater elements, stepping means including in said distributor for stepping the same sequentially through said plurality of step positions, said stepping means being energizable by said pulses of low voltage electrical energy and upon energization by such a pulse being operable to step said distributor from one step position to the next step position in the sequence, and means including contacts rotatable with said hub for conducting said pulses of high voltage electrical energy to said distributor for distribution to said heater elements and for conducting said pulses of low voltage electrical energy to said stepping means.

6. In a rotor blade deicing system for a helicopter including a fuselage and including a rotor blade connected to a hub supported for rotation relative to the fuselage, the combination of a plurality of electrical heater elements located adjacent the surface of said blade and arranged so that each is respectively associated with a different area of said blade surface, a source of electrical energy carried by said fuselage, a distributor mounted on said hub for rotation therewith, said distributor having an input terminal and a plurality of output terminals electrically connected respectively with one said of said heater elements and being shiftable between a plurality of step positions at each of which positions a different one of said output terminals is connected to said input terminal, a line connected in common to the other sides of said heater elements, means including contacts rotatable with said hub for connecting said distributor input terminal and said common line to said source of energy to provide a circuit for the flow of electrical energy from said source through the particular heater element connected to said input terminal by the operation of said distributor, timer means in said circuit operable to repetitiously interrupt the flow of electrical energy therethrough to provide timed intervals during which electrical energy flows through said circuit alternating with timed intervals during which no electrical energy flows through said circuit, and stepping means included in said distributor for shifting the same from one of said step positions to another during each interval during which no electrical energy flows in said circuit and in such a manner that said output terminals are sequentially connected with said input terminal so that said heater elements are in turn sequentially placed in said circuit for energization by the flow of electrical energy therethrough.

7. The combination as defined in claim 6 further characterized by said timer means including means responsive to the outside air temperature and operable to vary the duration of said timed intervals in such a manner that the average amount of electrical energy flowing through said circuit is increased in response to a drop in the outside air temperature and decreased in response to a rise in the outside air temperature.

8. The combination as defined in claim 6 further characterized by said stepping means comprising a solenoid motor connected between said input terminal and said common line so as to be in parallel electrical relationship with the heater element connected to said input terminal by the operation of said distributor with the result that said solenoid motor is energized and de-energized simultaneously with the sequential energization and de-energization respectively of said heater elements.

9. The combination as defined in claim 6 further characterized by means for supplying other electrical energy to said distributor during the intervals between the sequential energization of said heater elements, which other electrical energy is at a voltage different from the voltage of the electrical energy supplied to the said heater elements, and said stepping means comprising a solenoid motor energized by said other electrical energy.

10. In a rotor blade deicing system for a helicopter including a fuselage and including a plurality of rotor blades connected to a hub supported for rotation relative to the fuselage, the combination of a plurality of electrical heater elements located adjacent the surfaces of said blades and arranged so that the elements on each blade are respectively associated with different areas of the associated blade surface, a source of electrical energy carried by said fuselage, a distributor mounted on said hub for rotation therewith, said distributor having an input terminal and a plurality of output terminals and being sequentially shiftable through a plurality of step positions at each of which a different one of said output terminals is electrically connected with said input terminal, a ground terminal rotatable with said hub, conductor means for electrically connecting said input terminal and said ground terminal to said source, conductor means electrically connecting said heater elements between said output terminals and said ground terminal in such a manner that as said distributor is sequentially shifted between the various step positions the heater elements on each blade are sequentially placed in circuit with said input terminal and said ground terminal, and means for repeatedly sequentially shifting said distributor through its various step positions.

11. The combination as defined in claim 10 further characterized by means for repetitiously interrupting the flow of electrical energy from said power source to said distributor so that said electrical energy is delivered to said distributor in pulses, and said means for repeatedly sequentially shifting said distributor being operable to shift said distributor from one step position to the next step position in the sequence during the intervals between successive pulses.

12. In a rotor blade deicing system for a helicopter including a fuselage and including a plurality of rotor blades connected to a hub supported for rotation relative to the fuselage, the combination of a plurality of electrical heater elements located adjacent the surfaces of said blades and arranged so that the elements on each blade are respectively associated with different areas of the associated blade surface, a source of electrical energy carried by said fuselage and having two terminals one of which terminals is grounded to said fuselage, a distributor mounted on said hub for rotation therewith, said distributor having an input terminal and a plurality of output terminals and being sequentially shiftable through a plurality of step positions at each of which a different one of said output terminals is electrically connected with said input terminal, a ground terminal rotatable with said hub, means including a first slip ring for electrically connecting the ungrounded terminal of said source to said distributor input terminal, means including a second slip ring for electrically connecting said ground terminal to said fuselage, conductor means electrically connecting said heater elements between said output terminals and said ground terminal in such a manner that as said distributor is sequentially shifted between its various step positions the heater elements on each blade are sequentially placed in circuit with said input terminal and said ground terminal, and means for repeatedly sequentially shifting said distributor through its various step positions.

No references cited.